(12) United States Patent
De Los Santos Vílchez et al.

(10) Patent No.: US 12,348,963 B2
(45) Date of Patent: Jul. 1, 2025

(54) METHOD AND SYSTEM FOR PROVIDING IDENTITY AND AUTHENTICATION TO A DATA-GENERATION DEVICE

(71) Applicant: TELEFONICA CYBERSECURITY & CLOUD TECH S.L.U., Madrid (ES)

(72) Inventors: Sergio De Los Santos Vílchez, Madrid (ES); Álvaro Núñez-Romero Casado, Madrid (ES); Alberto Ten Morón, Madrid (ES); Enrique Ortiz Enríquez De Salamanca, Madrid (ES)

(73) Assignee: TELEFONICA CYBERSECURITY & CLOUD TECH S.L.U., Madrid (ES)

( * ) Notice: Subject to any disclaimer, the term of this patent is extended or adjusted under 35 U.S.C. 154(b) by 212 days.

(21) Appl. No.: 18/268,067

(22) PCT Filed: Sep. 22, 2021

(86) PCT No.: PCT/ES2021/070688
§ 371 (c)(1),
(2) Date: Jun. 16, 2023

(87) PCT Pub. No.: WO2022/129652
PCT Pub. Date: Jun. 23, 2022

(65) Prior Publication Data
US 2024/0056809 A1 Feb. 15, 2024

(30) Foreign Application Priority Data
Dec. 17, 2020 (EP) .................................. 20383110

(51) Int. Cl.
*H04W 12/06* (2021.01)
*H04W 12/069* (2021.01)
*G06F 21/44* (2013.01)

(52) U.S. Cl.
CPC .......... *H04W 12/069* (2021.01); *G06F 21/44* (2013.01); *G06F 2221/2111* (2013.01)

(58) Field of Classification Search
CPC ... H04W 12/069; H04W 12/50; H04W 12/63; H04W 12/71; G06F 2221/2111;
(Continued)

(56) References Cited

U.S. PATENT DOCUMENTS

2013/0311771 A1* 11/2013 Hoggan ................ H04L 9/3268
 713/156
2019/0250899 A1* 8/2019 Riedl .................... H04L 9/0825
(Continued)

OTHER PUBLICATIONS

ITU-T, "Unleashing the potential of the Internet of things", International Telecommunications Union, Dec. 31, 2016 [en línea] [recuperado el Dec. 3, 2021], Recuperado de < URL: https://www.itu.int/pub/T-TUT-SSCIOT-2016-2 >, 1054 pages, ISSN 978-92-61-17981-.

(Continued)

*Primary Examiner* — Harunur Rashid
(74) *Attorney, Agent, or Firm* — Sughrue Mion, PLLC

(57) ABSTRACT

A method and system for providing identity and authentication to a data-generation device is disclosed. The method comprises the provision, by a computing platform, of a beacon for a data-generation device, said beacon including an identification code and providing the data-generation device with connection and security functions; activating, by means of the computing platform, the data-generation device by using and verifying a physical access challenge; verifying, by means of the beacon, a state of activation of the data-generation device by using the identification code; providing, by means of the computing platform, a digital certificate to the beacon; and sending, by means of the beacon, a security verification to the platform, such that the (Continued)

data-generation device can securely establish future communications with remote computer equipment.

12 Claims, 2 Drawing Sheets

(58) Field of Classification Search
CPC ........ G06F 21/44; G06F 21/606; G06F 21/86;
H04L 9/50; H04L 63/08; H04L 2209/805;
H04L 9/3234; H04L 9/3263; G16Y 30/10
See application file for complete search history.

(56) References Cited

U.S. PATENT DOCUMENTS

| | | | |
|---|---|---|---|
| 2019/0268166 A1* | 8/2019 | Bojireddy | H04L 9/3268 |
| 2020/0036712 A1* | 1/2020 | Soundararajan | H04L 63/12 |

OTHER PUBLICATIONS

"Online Certificate Status Protocol", Wikipedia, May 30, 2020 [en línea][recuperado el Dec. 10, 2021], Recuperado de <URL: https://es.wikipedia.org/w/index.php?title=Online Certificate Status Protocol&oldid=126509333>, 5 pages.
International Search Report of PCT/ES2021/070688 dated Dec. 15, 2021 [PCT/ISA/210].

* cited by examiner

METHOD AND SYSTEM FOR PROVIDING IDENTITY AND AUTHENTICATION TO A DATA-GENERATION DEVICE

CROSS REFERENCE TO RELATED APPLICATIONS

This application is a National Stage of International Application No. PCT/ES2021/070688, filed Sep. 22, 2021, claiming priority to European Patent Application No. 20383110.2, filed Dec. 17, 2020.

TECHNICAL FIELD

The present invention relates to a method and system for providing identity and authentication to a data-generation device (for example, a motor, a sensor, a valve, a drone, an electric charger, etc.).

In this document, by beacon it should be understood a hardware and/or software module/element attached to a data-generation device to grant the device functionalities such as connectivity, identification, security, etc. The data generated may include measurements, device location, physical or working conditions, etc. Data can also include information about the user/operator operating the device, if any.

BACKGROUND OF THE INVENTION

Isolated data-generation devices may perform critical operations, such as measurements, access control, resource allocation, etc. These devices may need to be monitored in detail to make sure they report correct measurements, enforce correct policies on access control or resource allocation, are in the correct location, etc. As such, each device needs a robust identity association to guarantee the security of the information exchange, and the authenticity and integrity of the generated information.

From document US20190250899A1 a system and a method for performing service-initiated updates to IoT devices. Devices can communicate with a cloud platform via encrypted communication. The invention described in this patent application does not take into account the identity of the eventual user that handles the device, nor does it include the possibility of storing in the platform the communication from the beacons immutably (for example, using a distributed ledger, i.e., an electronic system or database to record information that is not executed by a single entity, thus allowing the storage and use of data that may be decentralized and distributed both privately and publicly). A mechanism guaranteeing the integrity of the devices and the monitoring of their general conditions is also not contemplated.

On the other hand, document US20200036712A1 allows to certify the identity of different devices based on a distributed ledger, against a centralized identity. The devices and the platform can communicate securely and sign transactions. This invention does not account for the identity of the eventual user operating the device. A mechanism guaranteeing the integrity of the devices and the monitoring of their general conditions is also not contemplated.

Thus, new methods and systems are required to provide identity and authentication to a data-generation device that guarantee: that the data is signed and cyphered, that the communication and transmission of data between the device and the platform server, as well as with the client servers, is secure, in addition to allowing an authentication of the data-generating devices in the platform and that the data generated may be externally supervised and audited.

Exposure of the Invention

For that purpose, examples of an embodiment of the present invention provide, according to a first aspect, a method for providing identity and authentication to a data-generation device. The method comprises: providing, by a computing platform, a beacon into a data-generation device; said beacon including an identification code and providing the data-generation device with connection and security functionalities; activating, by means of the computing platform, the data-generation device using and verifying a physical access challenge (for example, a QR code, a group of capacitive points included in a capacity surface, etc.); verifying, by means of the beacon, an activation status of the data-generation device using the identification code; providing, by means of the computing platform, a digital certificate to the beacon; and sending, via the beacon, a security verification to the platform (for example, a cryptographic operation to check that the identity is still robust and everything is correct with the beacon). So that the data-generation device can securely establish future communications with remote computer equipment.

According to the present invention, the data-generating device may comprise a motor, a sensor, a valve, an electric charger, a shared vehicle, an energy production system, an operational technology device or a drone, among others.

In an example of embodiment, the step of providing the beacon to the data-generating device is performed after having received a request from the data-generating device.

In an example of embodiment, the method further comprises authenticating the beacon and a user operating the data-generating device, jointly, by issuing, by the computing platform, a unique identifier for the beacon-user pair and storing a part of the unique identifier in the beacon and another part of the unique identifier in a memory of the data-generating device.

Additionally, the computing platform may pair the unique identifier of the beacon-user pair with the digital certificate provided to the beacon and replace the digital certificate if a user change is detected or reported.

In an example of embodiment, the method further comprises authenticating the beacon and a user operating the data-generating device, separately, by identifying of the user using the data-generating device and, subsequently, correctly identifying the user and contact of the data-generating device with the beacon, performing a joint identification of the user and the beacon and generating a certificate based on both identities.

In an example of embodiment, the method further comprises storing information about one or more users operating the data-generating device in the digital certificate provided to the beacon and modifying or replacing the digital certificate if the computing platform detects or is informed about a user(s) change.

In an example of embodiment, the beacon comprises an anti-tampering module that incorporates one or more protection mechanisms to avoid at least said digital certificate from being compromised.

In an example of embodiment, the data-generation device is a first device that is part of a first confederation with a plurality of data-generation devices. Each beacon provided to each data-generation device has a different identification code. Likewise, the first confederation is blind (i.e., it only has visibility of its confederation) to other confederations of the computing platform.

Examples of an embodiment of the present invention provide, according to a second aspect, a system for providing identity and authentication to a data-generation device.

The system comprises: a computing platform; a data-generation device; and a beacon. According to the proposed system, the computing platform is configured to: provide the beacon to the data-generation device, including said beacon an identification code and providing to the data-generation device connection and security functionalities; activate the data-generation device using, and checking, a physical access challenge; and provide a digital certificate to the beacon, so that the beacon, after sending a security verification to the computing platform, can securely establish future communications with remote computer equipment.

In an example of embodiment, the beacon comprises a communication module and a controller operatively connected to the communication module and configured to store the digital certificate.

In an example of embodiment, the beacon comprises an anti-tampering module that incorporates one or more protection mechanisms to avoid at least said digital certificate from being compromised.

The present invention assures that:
data are signed and cyphered,
data-generation devices may authenticate into the platform,
data generated by a data-generation device may be monitored and audited externally,
data collection is resilient thanks to the distributed ledger collecting it, which allows to guarantee data quality and integrity,
data-generation devices may be monitored (location, operations, conditions, etc.), being sure of their integrity and identity,
communication and transmission of data between the device and the server of the platform, as well as client servers, is secure,
the possibility of having a hierarchical organization of the devices into confederations,
the possibility of accounting the identity of both the device and the user operating it.

BRIEF DESCRIPTION OF THE DRAWINGS

The previous and other advantages and features will be more fully understood from the following detailed description of examples of embodiment, with reference to the attached figures, which must be considered in an illustrative and non-limiting manner, in which.

DETAILED DESCRIPTION OF THE INVENTION AND EXAMPLES OF EMBODIMENT

The present invention provides a method, and corresponding system, to provide identity and authenticity to data-generation devices, for example, sensors, motors, valves, energy production systems, etc. In particular, the invention is based on a computing platform that provides the data-generation devices with beacons with the necessary functionalities, including identity, digital certificates issued by a public key infrastructure (PKI), communication, use of a distributed ledger, beacon operator authentication, etc.

In particular, the proposed architecture for each beacon: 1) The communication platform 100 assigns it an identification code; 2) the identification code is activated by platform 100 and a digital certificate is issued by the platform 100; 3) consequently, it can establish a secure communication with remote servers, including one or more platform servers, as well as with any eventual client servers 120. Any eventual client servers 120 go through the same procedure as above, the secure communication therefore being a bidirectional SSL communication using the certificates issued by the communication platform 100. The beacon 110, as explained below, particularly includes an encryption module so as to make this functionality available.

Figure 1:
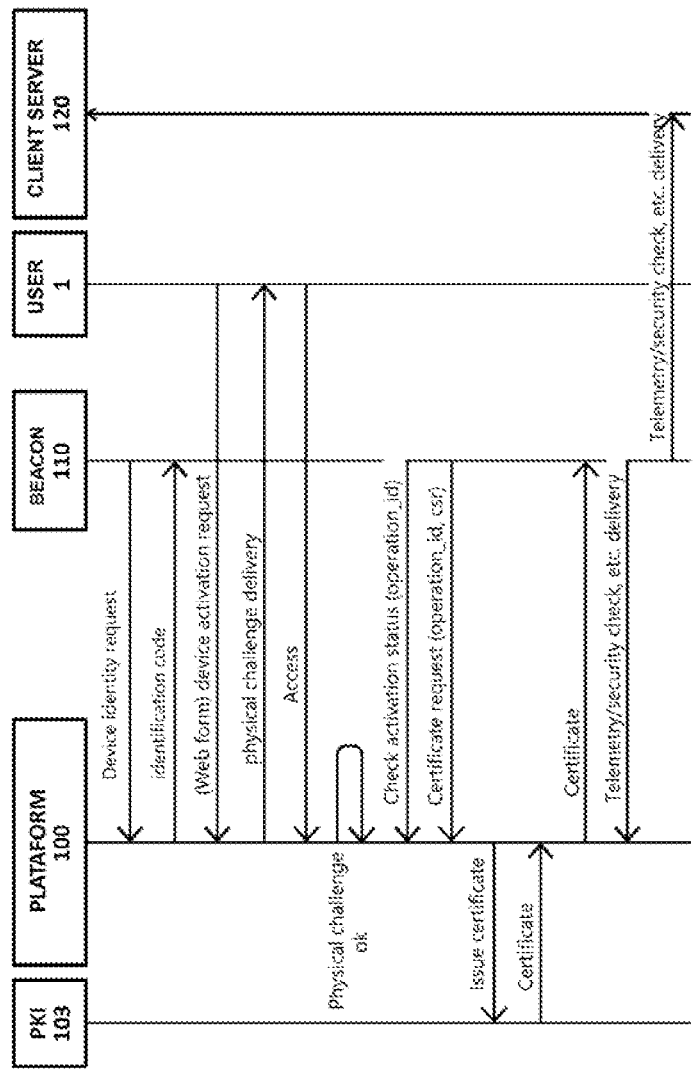
FIG. 1 is a flow chart illustrating an exemplary embodiment of the proposed method.

Referring to FIG. 1, a possible implementation of the proposed method, is illustrated therein. In particular, in this example of embodiment, first, a beacon 110 sends an identity request of the data-generation device to the communication platform 100 (or to a server thereof). Next, the communication platform 100 responds with an identification code of the operation. User 1 operating the data-generation device sends a request to the communication platform 100 through a web form for device activation, and the users request is answered by the communication platform 100 with a physical access challenge, for example, a QR code, a set of capacitive points included in a capacity surface, the entry of a password, etc. Once the user 1 has accessed the communication platform 100, it verifies the physical access challenge. Then, the beacon 110 checks the activation status of the data-generation device using the identification code, and requests a digital certificate from the communication platform 100. Next, the communication platform 100 requests the PKI 103 to issue the digital certificate, the latter transmits it and the communication platform 100 forwards the digital certificate to the beacon 110. Finally, the beacon 110 answers with a security check of the data generating device and sends said security check to a client server 120.

In some examples of embodiment, the client servers 120, similarly, can be assigned identification codes and can be issued digital certificates by the communication platform 100, thus being able to perform secure communications with the beacons 110 and the communication platform 100. This solution, which includes a dedicated PKI 103, makes it possible to secure the entire system and make that no element trusts other elements that are not identified by a digital certificate issued by the PKI 103.

Indicating that the inclusion of the dedicated PKI 103 is optional, and may, in some examples of embodiment, not be included in the proposed system. In this case, the solution is faster and cheaper, although it does not provide the same security in the system.

The data collected by the data-generation devices are signed and transmitted to the communication platform 100. Depending on the configuration of the data-generation device and the nature of the data, these are stored in a database 101 or in the block chain (or distributed ledger) 102. The client servers 120 can establish what data from which devices they want to be stored and where.

In some examples of embodiment, an authentication of the beacon 100 and/or the user 1 is included. The communication platform may authenticate the two elements separately, or as a pair.

If the beacon 110 and user 1 authenticate as a pair, the communication platform 100 issues a unique identifier for the beacon-user pair (then one half may be stored in the beacon 110 and the other half in a memory held by user 1, so only the two elements together can be authenticated as the pair in question). In this case, if the pair is generally stable (i.e., the same user 1 usually operate the same data-generation device), the identity of the pair can be matched with the digital certificate stored in the beacon 110. Said digital certificate can be replaced, where appropriate, when the user 1 is substituted/changed.

Alternatively, the data of the user 1 operating the data-generation device can be included in the signed digital certificate together with that of the beacon 110. Also, if there are more users operating the data generating device or if the user 1 changes with the time, a different digital certificate is issued for each user that operates the data-generation device, including data from the beacon 110 and from the data generating device that it operates.

Figure 2:
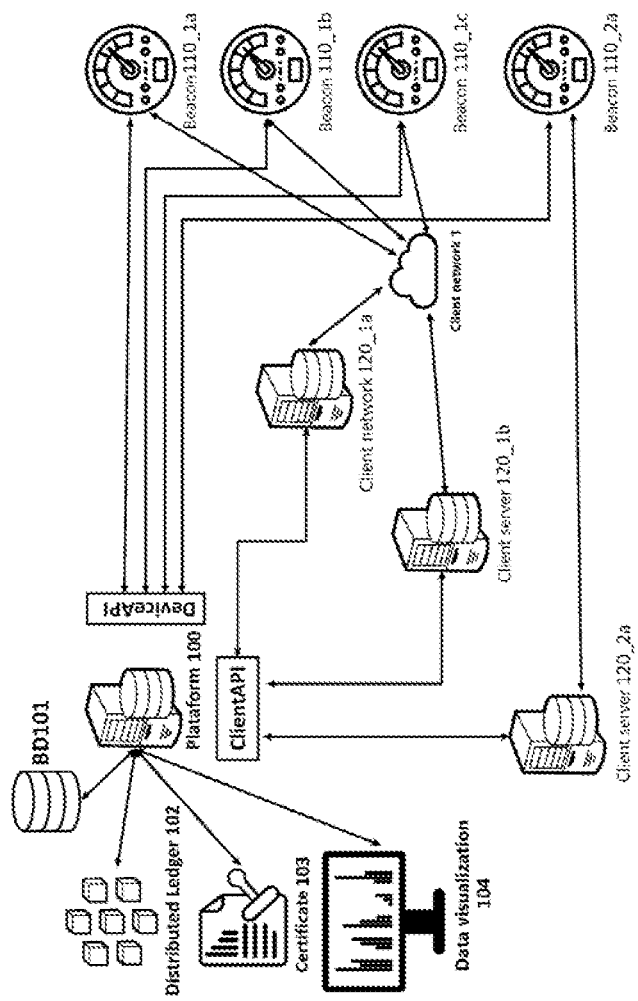
FIG. 2 schematically illustrates an exemplary embodiment of the proposed system including two different confederations: Confederation 1, including 120_1a and 120_1b client servers, and 110_1a, 110_1b and 110_1c beacons; and Confederation 2, including 120_2a client server and 110_2a beacon.

Referring to FIG. 2, it is illustrated an example of an embodiment of the proposed system in which different confederations have been established in the communication platform 100, to accommodate different clients/organizations. Each confederation includes at least one client server 120 and a beacon 110. Notably, each confederation will have visibility of itself only and not of the other confederations. Likewise, other hierarchical levels can be defined, if needed by the client/organization.

In an example of embodiment, each confederation may include a dedicated PKI 103.

The beacons 110 have the appropriate APIs to communicate with the communication platform 100. The same happens with the client servers 120. Thanks to this secure communication infrastructure, the client servers 120 can perform, among others, the following operations, through the communication platform 100: list all beacons 110 in the confederation (platform 100 may periodically check the status of beacons 110, or perform a check on demand); check the status of a beacon 110 in the confederation; revoke a beacon 110; replace a beacon 110; send a beacon 110 event to the distributed ledger 102, etc.

In some examples of embodiment, the beacon (or beacons) 110 (which can be considered as a closed box/module with HW and/or SW functionalities) includes a plurality of modules/units controlled by a controller module. For example, the beacon 110 may include a communications module to provide network connectivity (for example, via a GSM module or SIM card embedded in the beacon itself). The beacon 110 may also have a positioning module, which allows knowing at all times the location of the data-generation device, if necessary. In some examples, the beacon 110 also includes a capacitive surface that includes a unique pattern (for example, a set of invisible capacitive dots embedded in the surface of the beacon, representing a unique pattern).

The pattern can be included during the manufacturing of the beacon 110 and, preferably, it cannot be edited afterwards. The pattern includes a number of points limited by the minimum between the maximum number of points readable by the capacitive screen. The pattern may include dots of a size and at a mutual distance compatible with the capacitive screen.

The beacon 110 may also include a security module, for example, a hardware security module (HSM), thus enabling encryption functions. Likewise, the beacon 110 can include anti-tampering modules to prevent the digital certificate they store from being compromised. The anti-tampering module can use the measurements of the sensors included in the data-generation device to detect tampering attempts and/or misuse, including the accelerometer, the shock detector, the thermometer, the geolocation, etc.

According to the above descriptions, the present invention can be achieved in several forms and embodiments. All applications, modifications and alterations required to be protected in the claims must be considered within the scope of protection of the present invention.

The scope of the present invention is defined in the following set of claims.

The invention claimed is:

1. A method for providing identity and authentication to a data-generation device, comprising:
providing, by a computing platform, a beacon to the data-generation device, said beacon including an identification code and providing the data-generation device with connection and security functionalities;
activating, by the computing platform, the data-generation device using and checking a physical access challenge;
checking, by the beacon, an activation status of the data-generation device using the identification code;
providing, by the computing platform, a digital certificate to the beacon; and
sending, by the beacon, a security check to the platform, such that the data-generation device can securely establish future communications with remote computer equipment;
wherein said method further comprises authenticating the beacon and a user operating the data-generating device, separately, by identifying the user using the data-generating device and, subsequently, correctly identifying the user and contact of the data-generating device with the beacon, performing a joint identification of the user and the beacon and generating a certificate based on both identities.

2. Method according to claim 1, wherein the step of providing the beacon to the data-generation device is performed after having received a request from the data-generation device.

3. Method according to claim 1, further comprising authenticating the beacon and a user operating the data-generation device, jointly, by issuing, by the computing platform, a unique identifier for the beacon-user pair and storing a part of the unique identifier in the beacon and another part of the unique identifier in a memory of the data-generation device.

4. Method according to claim 3, further comprising pairing, by the computing platform, the unique identifier of the beacon-user pair with the digital certificate provided to the beacon.

5. Method according to claim 4, further comprising replacing the digital certificate if a user change is detected or notified.

6. Method according to claim 1, further comprising storing information about one or more user(s) operating the data-generating device in the digital certificate provided to the beacon and modifying or replacing the digital certificate if the computing platform detects or is informed about a user(s) change.

7. Method according to claim 1, wherein the beacon comprises an anti-tampering module that incorporates one or more protection mechanisms to avoid at least said digital certificate from being compromised.

8. Method according to claim 1, wherein the data generating device is a first device that is part of a first confederation with a plurality of data-generation devices, wherein each beacon provided to each data-generation device has a different code of identification, and wherein the first confederation is blind to other confederations of the computing platform.

9. A system for providing identity and authentication to a data-generation device, comprising:
- a computing platform;
- a data-generation device; and
- a beacon;
- wherein the computing platform is configured to:
  - provide the beacon to the data-generation device, said beacon including an identification code and providing the data-generation device with connection and security functionalities;
  - activate the data-generation device using and checking a physical access challenge;
  - provide a digital certificate to the beacon,
  - authenticate the beacon and a user operating the data-generating device, separately, by identifying the user using the data-generating device and, subsequently, correctly identifying the user and contact of the data-generating device with the beacon, performing a joint identification of the user and the beacon and generating a certificate based on both identities,
- so that the beacon, after sending a security check to the computing platform, can securely establish future communications with remote computer equipment.

10. System according to claim 9, wherein the beacon comprises a communication module and a controller operatively connected to the communication module and configured to store the digital certificate.

11. System according to claim 9, wherein the beacon comprises an anti-tampering module that incorporates one or more protection mechanisms to avoid at least said digital certificate from being compromised.

12. System according to claim 9, wherein the data-generating device comprises a motor, a sensor, a valve, an electric charger, a shared vehicle, an energy production system, an operational technology device or a drone, among others.

* * * * *